United States Patent
Lauxen et al.

(10) Patent No.: US 9,216,703 B2
(45) Date of Patent: Dec. 22, 2015

(54) ARRANGEMENT FOR SECURING AN INNER TRIM PANEL TO A VEHICLE SUBSTRATE

(71) Applicant: FORD GLOBAL TECHNOLOGIES, LLC, Dearborn, MI (US)

(72) Inventors: Horst Lauxen, Hennef (DE); Volker Krolzig, Pulheim (DE); René Berns, Frechen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 12 days.

(21) Appl. No.: 14/132,241

(22) Filed: Dec. 18, 2013

(65) Prior Publication Data

US 2014/0191526 A1     Jul. 10, 2014

(30) Foreign Application Priority Data

Jan. 7, 2013  (DE) .......................... 10 2013 200 108

(51) Int. Cl.
  *B60R 13/00*   (2006.01)
  *B60R 13/02*   (2006.01)
  *F16B 5/06*    (2006.01)

(52) U.S. Cl.
  CPC ........... *B60R 13/0206* (2013.01); *F16B 5/0628* (2013.01); *F16B 5/0657* (2013.01); *Y10T 24/304* (2015.01)

(58) Field of Classification Search
  CPC .. B60R 13/0206; F16B 5/0628; F16B 5/0657
  USPC ................. 296/1.08, 146.7; 24/297; 52/716.7
  See application file for complete search history.

(56) References Cited

U.S. PATENT DOCUMENTS

| 6,196,607 | B1 | 3/2001 | Gulisano | |
| 2003/0230044 | A1* | 12/2003 | Peterson | ...................... 52/716.5 |

* cited by examiner

*Primary Examiner* — Joseph D Pape
(74) *Attorney, Agent, or Firm* — Vichit Chea

(57) ABSTRACT

An arrangement for securing an inner panel to a vehicle substrate uses a securing clip mounted to a clip housing in an elongate hole with a closed end and an open end. The inner diameter of a securing region in the elongate hole is greater than the diameter of the shaft of the securing clip, allowing lateral shifting of the clip so that its shaft can realign during insertion into a corresponding mating hole in the substrate. The securing region of the elongate hole includes centering members constructed in such a manner that an inserted securing clip is retained in a centered position. Consequently, the tolerance compensation function of the clips is optimized.

14 Claims, 4 Drawing Sheets

ARRANGEMENT FOR SECURING AN INNER TRIM PANEL TO A VEHICLE SUBSTRATE

CROSS REFERENCE TO RELATED APPLICATIONS

This application claims priority to application 102013200108.8, filed in the German Patent and Trademark Office on Jan. 7, 2013, which is hereby incorporated by reference.

STATEMENT REGARDING FEDERALLY SPONSORED RESEARCH

Not Applicable.

BACKGROUND OF THE INVENTION

The present invention relates in general to trim mounting systems for vehicle interiors, and, more specifically, to an arrangement for securing an inner lining portion or trim panel to a vehicle bodywork or substrate (such as a door frame). At least one clip housing is provided on the trim panel having an elongate hole for receiving the head of a securing clip or pin. The elongate hole has a closed end and an open end. The head of the securing clip is able to be inserted laterally into the open end of the elongate hole, with the provision that the closed end of the elongate hole forms a securing region which cooperates with a shaft of the securing clip. The inner diameter of the securing region is greater than the diameter of the shaft of the securing clip, allowing the clip to shift laterally while remaining secured. After the securing clip is held in the elongate hole, it is pressed into and locked into a mating hole in the substrate in order to mount the trim panel such that the mounting arrangement is hidden from view. Lateral shifting of the shaft ensures that it can align with the substrate mating hole.

One conventional mounting arrangement is shown in U.S. Pat. No. 6,196,607, which refers to the securing clip as a pressure pin. Each clip has a tip that is to be secured in a corresponding hole of the vehicle substrate. After a plurality of securing clips have been secured in the respective clip housings, the inner lining portion is attached to the substrate by positioning the tips so that they approach the substrate mating holes. The spacings between the individual mating holes, however, are subject to specific production tolerances. In order to be able to compensate for these, the outer diameter of the shaft can be made smaller than the inner diameter of the opening of the housing in the inner lining portion in which it is inserted. The securing clip is thereby retained with lateral play in the opening of the inner lining portion and can assume an offset position relative to the opening. The spacing from one securing clip to another may thus vary in the context of possible offsets in the spacings of the mating holes, and can thus automatically adapt to the actual spacing of the mating holes in the substrate.

To reiterate, in order to assemble an inner lining portion on a vehicle substrate, the securing clips are first inserted into the elongate holes of the clip housings. Subsequently, when the inner lining portion is connected to the vehicle substrate, the tips of the securing clips have to be introduced in the mating holes.

In conventional use, the lateral shifting of the clips within the housing prior to mating with the substrate has resulted in an uncontrolled or random placement of each clip within its range of possible shifting movement at the time of attempted insertion into the substrate. In the event that a substrate mating hole is off tolerance in one direction and the corresponding clip is shifted to an extreme position in the opposite direction, a misalignment may occur that makes insertion difficult or impossible. Thus, the known arrangements do not ensure that the spacings of the securing clips correspond sufficiently to the spacings of the corresponding mating holes so that the tips of the securing clips can be readily inserted.

SUMMARY OF THE INVENTION

An object of the invention is to improve the arrangement in such a manner that an inner lining portion can be connected to the vehicle bodywork or substrate in a more simple manner.

This object is achieved according to the invention in that at least in the securing region of the elongate slot there are provided a centering member constructed in such a manner that an inserted securing clip is initially retained in a centered manner in the securing region. Consequently, the tolerance compensation function is optimized.

The term centered in the context of the present invention is intended to be understood to refer to a predetermined position of the shaft of the securing clip relative to the securing region of the elongate slot, prior to insertion into the mating holes of the substrate. The centered position may be a coaxial position between the securing region and securing clip.

Two securing clips which are inserted in the clip housings thereof, before they are connected to a vehicle substrate, assume a neutral position (i.e., centered in the securing region of the respective elongate slot). They assume neither a larger spacing, which would be possible in the context of the offsets, nor a smaller spacing.

As a result of the measure which ensures a centered (neutral) position of each securing clip within the associated clip housing, extremely large and extremely small spacings between two securing clips are prevented and in this manner the probability is increased that they can be inserted into the holes of the vehicle substrate provided for this purpose.

The securing region of the elongate slot of the clip housing includes a centering member. The centering member preferably includes at least one resilient centering element. Furthermore, the elongate hole of the clip housing may include a separate element insertable into the housing to define the resilient surface. In this manner, centering means may be easily obtained having different characteristics, for example, with a more or less powerful centering action. Furthermore, damaged centering means can be readily replaced for repair purposes. The separate replacement element may comprise plastics material and/or metal.

Advantageously, the inner lining portion is provided with at least one integrated clip housing (sometimes referred to as a "doghouse"). For an inner lining of a vehicle door, four of more securing clips may be used in order to securely connect the door lining to the vehicle door. The clip housings, during the production of the inner lining, may be formed as an integral component thereof.

BRIEF DESCRIPTION OF THE DRAWINGS

For ease of understanding, identical reference numbers are used for identical features in the different embodiments.

DETAILED DESCRIPTION OF PREFERRED EMBODIMENTS

Figure 1:
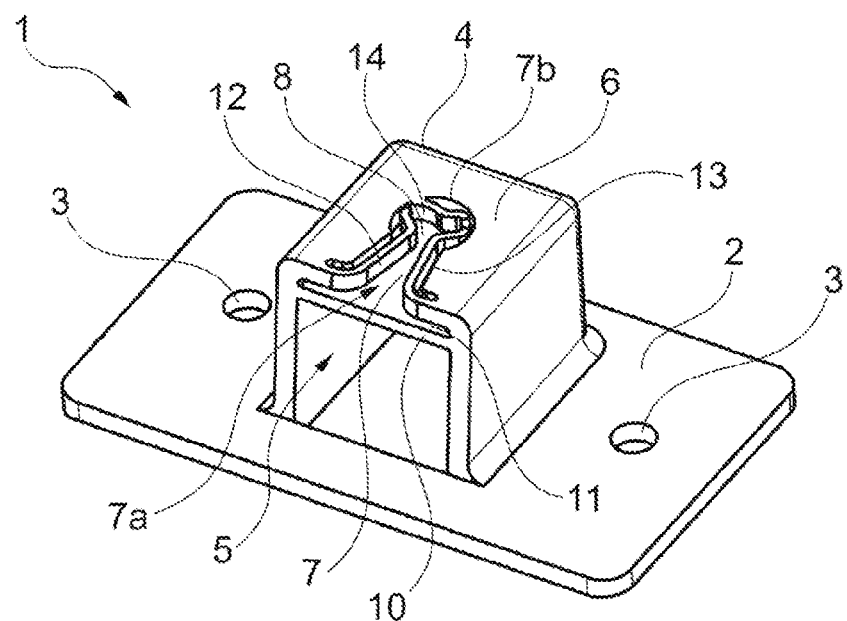
FIG. 1 shows a clip housing of an arrangement according to the invention.
Figure 2:
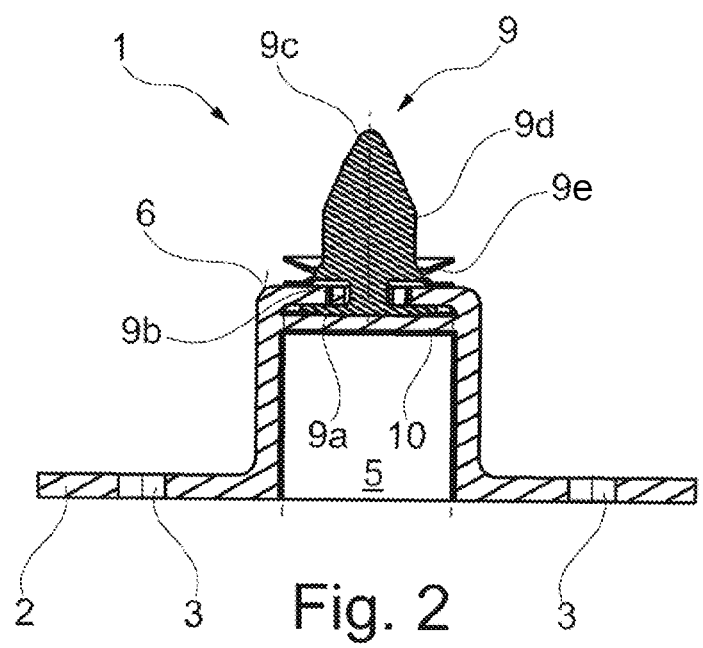
FIG. 2 is a cross-section through the clip housing according to FIG. 1 with the securing clip inserted.

According to FIG. 1, the clip housing 1 of the arrangement according to the invention comprises plastics material. It has a base plate 2 having two securing holes 3. Furthermore, it is provided with a housing 4 which is parallelepipedal. The parallelepipedal housing 4 has no base and instead the base plate 2 is recessed in this region. One of the parallelepiped sides has an opening 5. The upper side 6 of the parallelepiped facing away from the base plate 2 is provided with an elongate slot 7 which has a free end 7a. The free elongate slot end 7a is located at the parallelepiped side provided with the opening 5. The end 7b of the elongate slot 7 opposite the free end 7a forms a securing region 8 for a securing clip 9, as can be seen in FIG. 2. According to FIG. 1, a web 10 is provided spaced below the upper side 6 of the parallelepiped. A free space 11 is formed between the web 10 and the upper side 6. The free space 11 serves to receive a head 9a of the securing clip 9. In the elongate slot 7, there is provided a centering member, which may preferably that the form of resilient elements which extend into the securing region 8.

The resilient elements are constructed as bending beams or springs 12, 13 and 14. One end of each spring is constructed integrally with the clip housing 1. This is because the bending springs are formed on the inner wall of the elongate slot 7. At each elongate slot side, there extends a bending spring 12 or 13 in the region of the open end 7a of the elongate slot 7, respectively. The bending springs 12 and 13 each protrude with the free end thereof as far as a location in the securing region 8. The third bending spring 14 is constructed to be shorter than the other bending springs. It extends from the securing region 8 on the inner wall of the elongate slot 7. The free end thereof protrudes into the securing region 8.

If a securing clip 9 is inserted into the securing region 8, the bending springs are pretensioned since a shaft 9b of the securing clip 9 comes into contact with the bending springs 12, 13 and 14. The degree of pretensioning is dependent on the diameter which the shaft 9b has. The pretensioning may be so great and the resilient path of the bending springs 12, 13 and 14 so great that the free ends thereof touch the inner side of the elongate slot 7. The inner side then acts as a counter-bearing for the bending springs. When the bending springs become deformed, the free ends thereof may slide along the inner side of the elongate slot 7.

In FIG. 2, the clip housing 1 of FIG. 1 is illustrated in cross-section, with the securing clip 9 inserted. The securing clip 9 has a flat head 9a, a cylindrical shaft 9b and a conical tip 9c. Furthermore, another cylindrical region 9d with a collar 9e arranged thereon is provided below the tip. The flat head 9a of the securing clip 9 fits into the free space 11 which is formed between the web 10 of the clip housing and the upper side 6 thereof. Since its head 9a is enclosed, the securing clip 9 is fixed in the axial direction thereof. The cylindrical region 9d, which is formed below the conical tip 9c, has a diameter which is greater than the width of the elongate slot 7 of the clip housing. The securing clip 9 is retained centrally in the securing region 8 of the elongate slot 7 by means of the bending springs.

Figure 3:
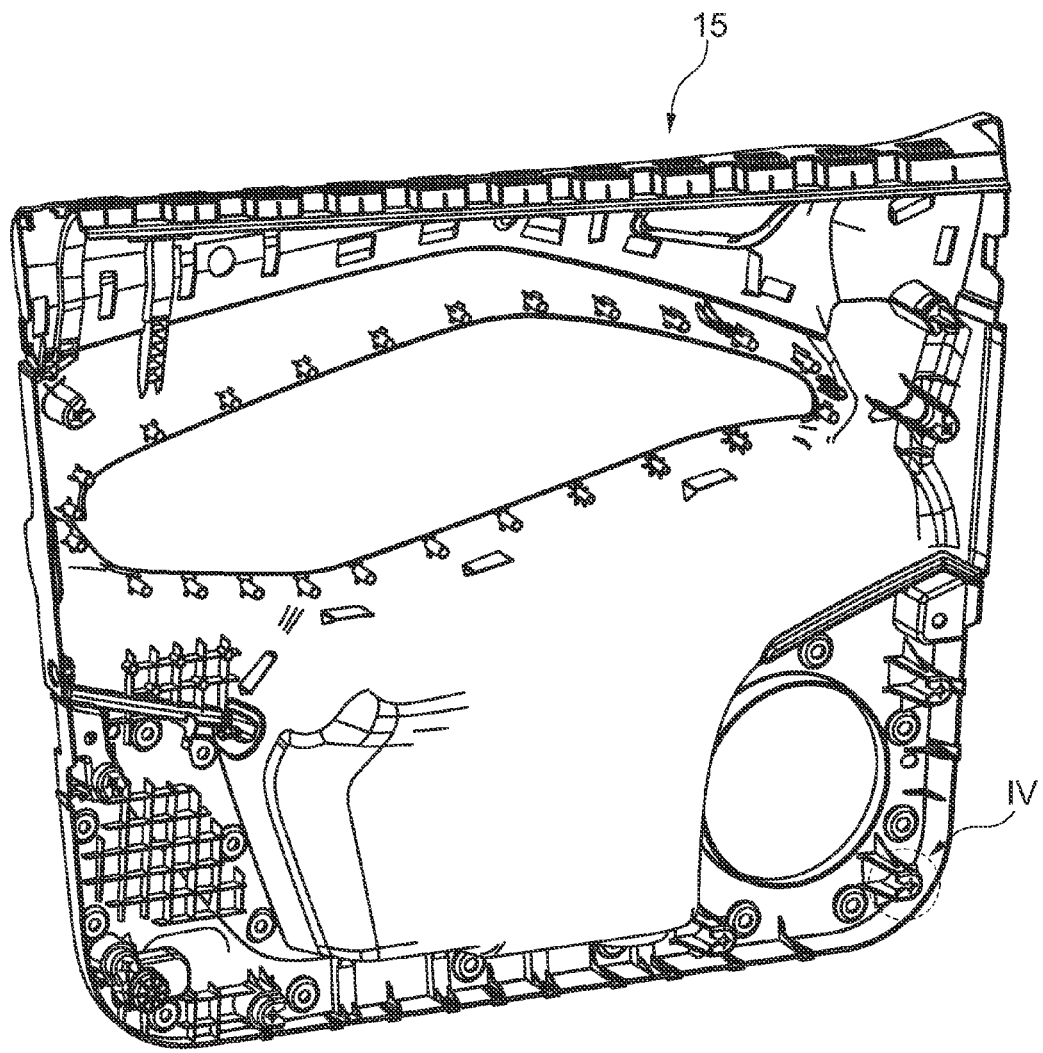
FIG. 3 shows an inner lining portion for a vehicle door having a plurality of integrated clip housings.
Figure 4:
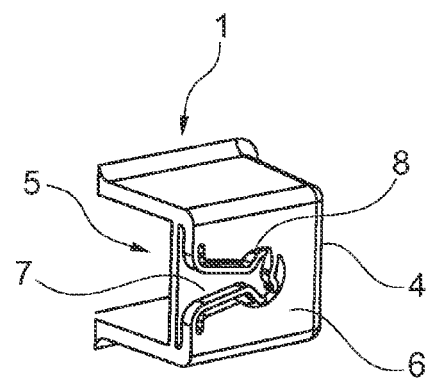
FIG. 4 is an enlarged cutout of an integrated clip housing according to FIG. 3.

FIG. 3 shows an inner lining portion 15 for a vehicle door. The inner lining portion 15 is produced from plastics material and provided with a plurality of integrated clip housings. An enlarged cutout of an integrated clip housing is illustrated in FIG. 4. The integrated clip housing substantially corresponds to that according to FIG. 1, the base plate 2 illustrated in FIG. 1 being replaced by the inner lining portion 15 which carries the integrated clip housing in an integral manner.

Figure 5:
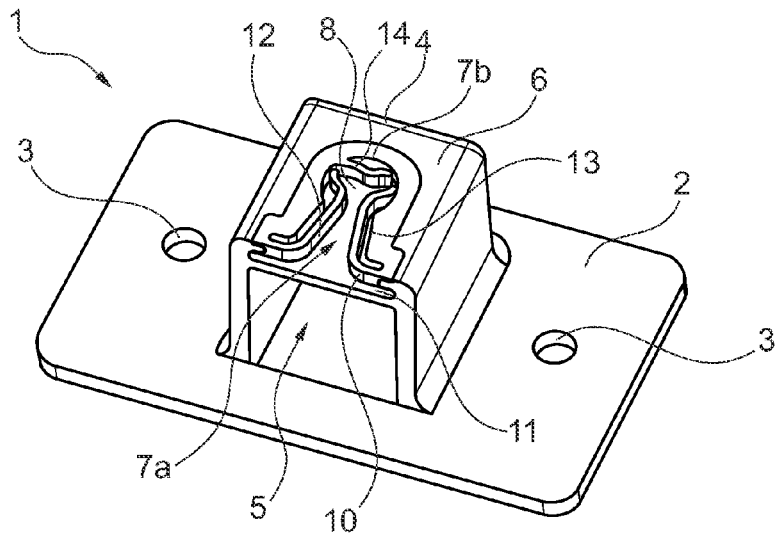
FIG. 5 shows an alternative clip housing having a separate replacement element having an elongate slot and centering means.

An alternative clip housing of plastics material is shown in FIG. 5. This is provided with a separate replacement element 16 having an elongate slot 7 and centering means. The replacement element 16 is also produced from plastics material. In FIG. 5, the replacement element 16 is connected to the clip housing 1. The centering means provided in this replacement element 16 correspond to those of the embodiment according to FIG. 1.

Figure 6:
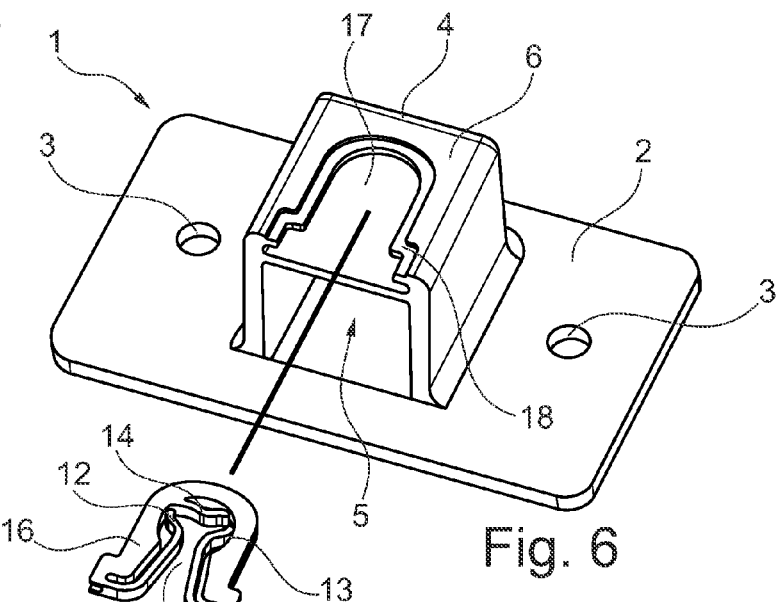
FIG. 6 shows the clip housing according to FIG. 5 without any replacement element.
Figure 7:
FIG. 7 shows the separate replacement element from the clip housing according to FIG. 5.

FIG. 6 shows the clip housing from FIG. 5 with the replacement element removed. The separate replacement element 16 is illustrated in FIG. 7. The upper side 6 of the clip housing has a recess 17 into which the replacement element fits. In order to connect the two components, the inner edge of the recess 17 is provided with a spring 18 and, on the outer edge of the replacement element 16, there is provided a groove 19 which corresponds to the spring 18 of the recess 17.

Figure 8:
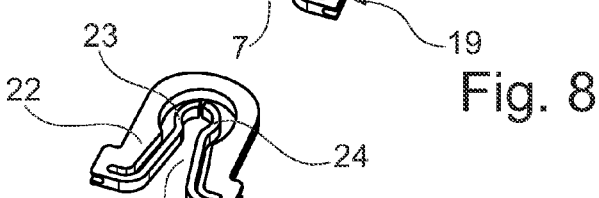
FIG. 8 shows an alternative replacement element having an elongate slot and centering means.

FIG. 8 shows an alternative replacement element 20, which can also be inserted into the recess 17 of the clip housing according to FIG. 6. It also has an elongate slot 7 and centering means and the outer edge thereof is also provided with a groove 19. In this embodiment, a symmetrical bending spring element 21 is provided as a centering means. It has a contour which extends parallel and with spacing relative to the elongate slot 7. In the region of the open end 7a of the elongate slot 7, the bending spring element 21 is secured at both sides, that is to say, is in each case integrally formed on one and the other elongate slot inner side. In the securing region 8 in this embodiment, there is no free end of a spring provided, but instead the two symmetric halves of the bending spring element 21 meet each other in the securing region 8 and are joined together at an apex.

Figure 9:
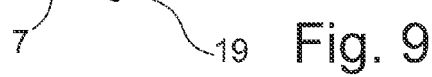
FIG. 9 shows another alternative of a replacement element having an elongate slot and centering means.

Another alternative for a replacement element is illustrated in FIG. 9. This replacement element 22 is based on the bending spring element according to FIG. 8. However, it has been modified and has two symmetrical bending springs 23 and 24. In contrast to FIG. 8, an interruption of the bending spring element (gap) is provided in the region of the apex. The free ends of the bending springs 23 and 24 are thereby produced and protrude into the securing region 8 and thus form two independent bending springs. The outer edge of the replacement element 22 is also provided with a groove 19 which corresponds to the spring 18 at the inner edge of the recess 17 of the housing of FIG. 6.

Figure 10:
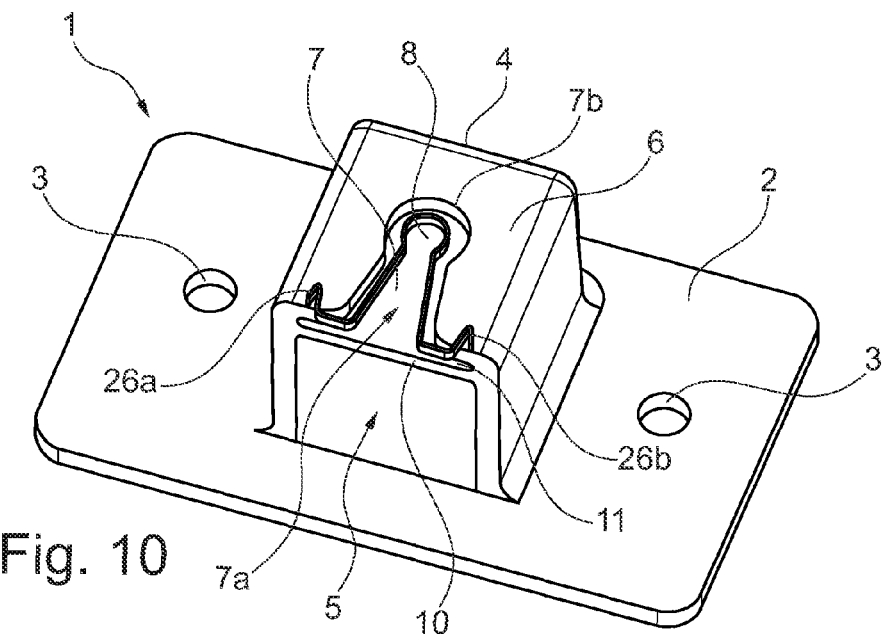
FIG. 10 shows an alternative clip housing having a separate replacement element having an elongate slot and centering means.
Figure 11:
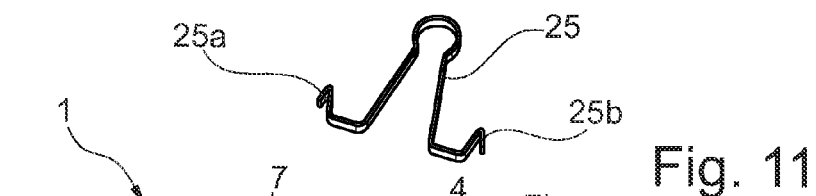
FIG. 11 shows the separate replacement element from the clip housing according to FIG. 10.

Another embodiment is illustrated in FIGS. 10 and 11. FIG. 10 shows another clip housing which substantially corresponds to the clip housing according to FIG. 1. However, the centering element has been modified. The modified centering element is a metal spring 25 arranged symmetrically in the elongate slot 7 of the clip housing. It has a contour which extends parallel and with spacing relative to the elongate slot 7, in a similar manner to the bending spring in FIG. 8.

In the region of the open end 7a of the elongate slot 7, the two ends of the metal spring 25 are secured to the clip housing. To this end, according to FIG. 11, a retention portion 25a or 25b is provided at each end of the metal spring, respectively. In a state corresponding to the retention portions 25a and 25b of the metal spring 25, the upper side 6 of the clip housing is provided with laterally open retention pockets 26a and 26b. These are constructed so as to be open at the side so that the retention portions 25a and 25b of the metal spring 25 can be inserted laterally into the retention pockets 26a and 26b, that is to say, in a direction parallel with the longitudinal axis of the elongate slot 7. The direction of the joining movement for the metal spring 25 is advantageously the same as the joining direction for pushing the securing clip 9 into the elongate slot 7. This correspondence of the joining direction promotes automation of the assembly.

Figure 12:
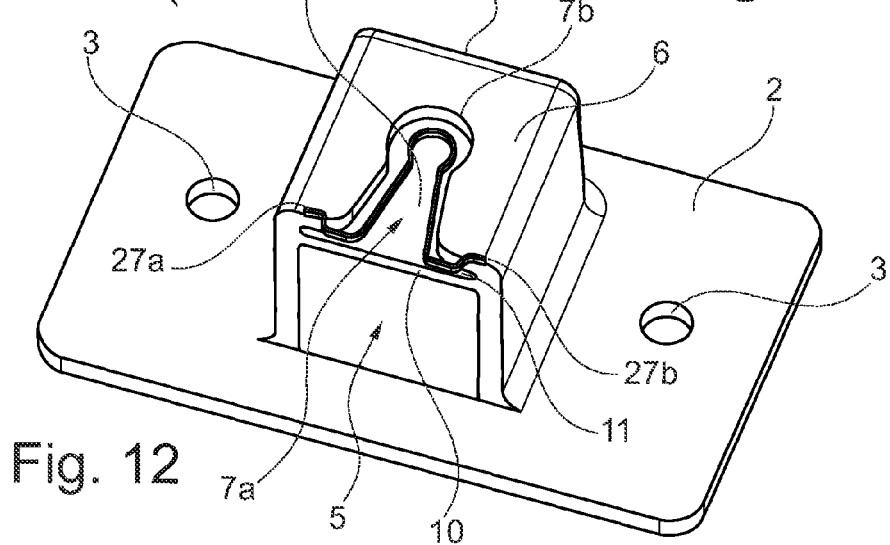
FIG. 12 shows an alternative clip housing having a separate replacement element having an elongate slot and centering means.
Figure 13:
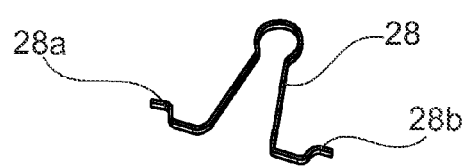
FIG. 13 shows the separate replacement element from the clip housing according to FIG. 12.

FIGS. 12 and 13 show an embodiment which is modified with respect to the embodiment mentioned above. FIG. 12 differs from the clip housing of FIG. 10 because of a different shape of the retention pockets 27a and 27b and because of a metal spring 28 which corresponds thereto. The retention pockets 27a and 27b of the clip housing are constructed so as to be open towards the top. Consequently, the corresponding retention pockets 28a and 28b of the metal spring 28 can be inserted from above into the retention pockets, that is to say, in a direction perpendicular relative to the upper side 6 of the clip housing. Furthermore, the metal spring 28 also has a contour which extends parallel and with spacing relative to the elongate slot 7 and which resembles the contour of the bending spring according to FIG. 8.

What is claimed is:

1. Apparatus securing an inner lining portion to a vehicle substrate, comprising:
   a clip housing having an elongate slot with closed and open ends, the closed end forming a securing region; and
   a securing clip inserted laterally into the elongate slot comprising a shaft captured in the securing region for extending axially toward a mating hole in the vehicle substrate;
   wherein the clip housing includes a centering member contacting the shaft that is pretensioned for centering the shaft in the elongate slot and is bendable for permitting lateral shifting of the shaft when contacting the mating hole.

2. The apparatus of claim 1, wherein an inner diameter of the securing region is greater than a diameter of the shaft of the securing clip within the securing region.

3. The apparatus of claim 1, wherein the centering member is comprised of at least one resilient centering element in the securing region of the elongate slot.

4. The apparatus of claim 1, wherein the elongate slot of the clip housing comprises a separate replacement element.

5. The apparatus of claim 4, wherein the separate replacement element is comprised of plastic material.

6. The apparatus of claim 4, wherein the separate replacement element is comprised of metal.

7. The apparatus of claim 1, wherein the clip housing is integrated with the inner lining portion.

8. Interior trim apparatus for a vehicle, comprising:
   a trim panel body having a outer finish side for forming an interior surface of a vehicle passenger compartment and an inner side;
   a plurality of clip housings extending from the inner side in a pattern matching a corresponding pattern of mating holes in a vehicle substrate to receive the trim panel body, each clip housing having an elongate slot with closed and open ends, the closed end forming a securing region; and
   a plurality of securing clips, each securing clip being inserted laterally into a respective elongate slot and comprising a shaft captured in the securing region for extending axially toward a respective mating hole in the vehicle substrate;
   wherein each clip housing includes a respective centering member contacting the respective shaft, wherein the centering member is pretensioned for centering the respective shaft in the respective elongate slot and is bendable for permitting lateral shifting of the respective shaft when contacting the respective mating hole.

9. The apparatus of claim 8, wherein an inner diameter of each securing region is greater than a diameter of the shaft of the respective securing clip within the respective securing region.

10. The apparatus of claim 8, wherein each centering member is comprised of at least one resilient centering element in the respective securing region of the respective elongate slot.

11. The apparatus of claim 10, wherein each respective elongate slot comprises a separate replacement element.

12. The apparatus of claim 11, wherein the separate replacement element is comprised of plastic material.

13. The apparatus of claim 11, wherein the separate replacement element is comprised of metal.

14. The apparatus of claim 8, wherein each clip housing is integrated with the trim panel body.

* * * * *